Feb. 2, 1943. H. L. COOKE ET AL 2,309,627
CONTOUR MAP AND METHOD OF MAKING SAME
Filed June 17, 1938 2 Sheets-Sheet 1

INVENTORS
H. L. COOKE
G. P. HARNWELL
BY
Moses + Nolte
ATTORNEYS

Feb. 2, 1943.  H. L. COOKE ET AL  2,309,627
CONTOUR MAP AND METHOD OF MAKING SAME
Filed June 17, 1938  2 Sheets-Sheet 2

INVENTORS
H. L. COOKE
G. P. HARNWELL
BY
Moses + Nolte
ATTORNEYS

Patented Feb. 2, 1943

2,309,627

UNITED STATES PATENT OFFICE 2,309,627

CONTOUR MAP AND METHOD OF MAKING SAME

Hereward Lester Cooke and Gaylord P. Harnwell, Princeton, N. J., assignors to Aero Survey Corporation, a corporation of Delaware Application June 17, 1938, Serial No. 214,208

14 Claims. (Cl. 35—41)

This invention relates to topographical contour maps in relief and to methods for preparing these maps by photographic means. It also relates to improvements in carvable blocks or blanks from which such maps may be prepared. It also relates to methods for preparing flat topographical maps from contoured reliefs.

In a United States patent to H. L. Cooke, No. 1,980,981, is described a method and means for producing carved blocks to correspond in form with terrain included in two overlapping photographs, by means of visual or so-called "plastic" images formed by stereoscopic projection of the photographs in correct relation. That patent also describes methods of producing said carved blocks in which the relation of vertical and horizontal scales could have any desired value within wide limits. The patent also describes methods of superposing photographically recorded images on said blocks whereby there were produced relief photographs in which all objects depicted were placed in a three dimensional relation corresponding to that in nature.

The present application describes an extension of the processes and means disclosed in U. S. Patent No. 1,980,981, and covers methods and means whereby true photographic relief maps may be produced on which are shown contour lines and also, if desired, grid lines, conventional map indications, and details of the photographs employed, all this information being recorded in a three dimensional relationship corresponding with that of the terrain covered.

An important feature of the present invention consists in the provision of layered or laminated blocks of a carvable medium from which relief maps may be made; laminations being provided in such succession in the blocks of carvable material that they will appear in the finished relief map as contour lines or zones. The blocks may also be provided with vertical division planes so as to provide grids visible in the finished relief.

It is a further object of this invention to provide a new method of making paper or other plane surface maps provided with contour lines, the preparation of which may be made to depend upon the use of our carved contour maps.

Various other and further advantages and objects of the invention will appear from the ensuing description of the drawings wherein Figure 1 is a perspective view of a laminated block before carving;

Figure 1:
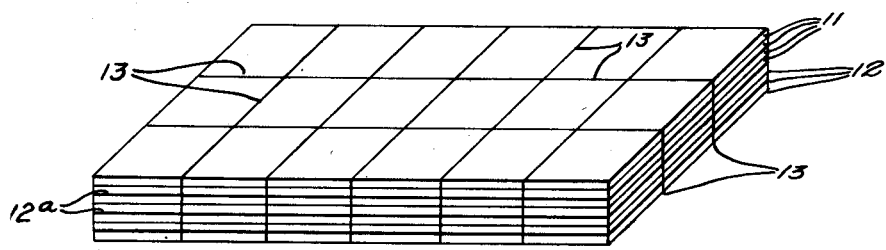
Figure 3:
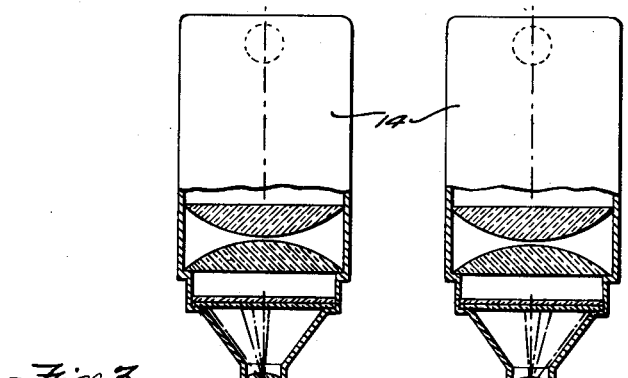
Figure 3 is a diagrammatic view of a projection apparatus suitable for use in producing the carved model.
Figure 4:
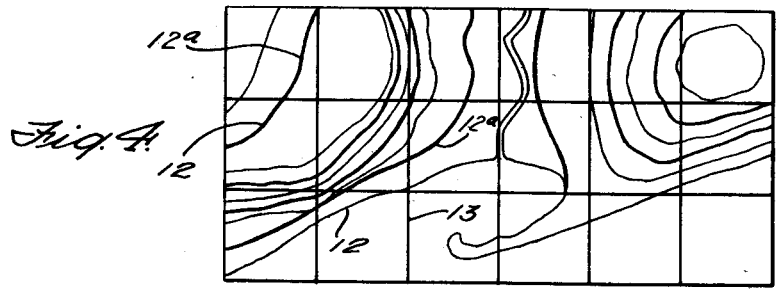
Figure 4 is a plan view of the carved block of the type shown in Figure 1.

In pursuance of the objects of this invention a laminated block construction such as is illustrated in Fig. 1 of any convenient carvable material is provided. We have found it preferable to use for construction of the block a relatively soft opaque plaster but any suitable material which will lend itself to carving may be used. It is furthermore preferable that the material used be light in color for reasons which will hereafter appear. The blank from which the relief map is to be carved is formed of a series of layers or laminations 11 each of which is of uniform thickness throughout made up of suitable material having between each two layers an extremely thin layer 12 of contrasting material. The spacing of the laminations of light material should correspond to the desired contour interval so that when the carving is made upon the block the thin darkened layers will appear as contour lines (see Fig. 4) and will thus accurately define the contour of the surface being reproduced. The contour layers should be made of a material which will not interfere with the action of the carving tool so that the block can be carved as a unit.

We have further found it useful to use thin darkened layers 13 in predetermined position perpendicular to the above-mentioned contour layers. When the carving is accomplished these layers will correspond to grid lines.

It is, however, not essential that the layer blocks employed for developing contour lines by the carving process to be described should be constructed to exhibit grid lines as such lines may be drawn on either the topographical relief maps or topographical plane maps to be described since they lie in a definite known relation to the control points employed in producing the proper plastic image.

In some instances it is useful to employ laminae of different colors between the successive layers of the block so that each successive contour line will be distinguished by its color, each color being made to correspond to a designated altitude. Instead of using differently colored laminae, certain of the contour laminae 12a may be made thicker than others so as to produce heavier contour lines at specified intervals.

Figure 2:
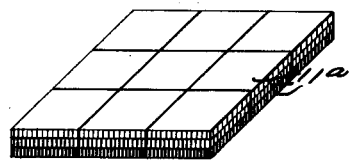
Figure 2 is a similar view of a modified form of block.

In Fig. 2 we have shown a slightly modified form of block in which the block is composed of layers 11a similar to the layers 11, but of varying shade. For instance, the lower layer may be dark and the successive layers may be made slightly lighter and lighter towards the top. When the map is carved from a block of this nature, the different contour zones may be identified by the shading and the carved map as a whole is given a shaded appearance, the valleys, for instance, being dark and the tops of the hills light. With the laminations of graded coloration, contours may be determined simply by following the varying shades of the contour zones, or the shaded layers may have thin contrasting layers between them as already described.

The production of a carved model of terrain may be accomplished by any convenient means. We prefer to employ the method disclosed in U. S. Patent No. 1,980,981 to H. L. Cooke, which is substantially as follows:

A block 15 is set up beneath two projectors 14 which are adapted to produce by projection on the surface of said block a plastic image in the manner described in said patent, and a model of the terrain is carved in the manner therein described. If desired, the overlapping photographs may be set up in the "Multiplex" type of apparatus which is one convenient embodiment of the apparatus of said patent.

The carving of an image corresponding with the plastic image on the laminated block produces a true relief of the terrain and the exposed edges of the contrasting layers correctly represent contour lines on the surface of the model, the contour interval depending upon the thickness of the laminations between successive contrasting layers. If the block is provided with vertical grid layers the grid lines will also appear on the carved model. The model shown in Fig. 4 may thus be used as a contoured relief of the terrain as it stands, but it is preferable to complete it with additional map data, and, if desired, also with a photographic representation of the terrain superimposed thereon. It is also desirable in most instances to provide for reproduction of the model, and the model may also be used for the preparation of contour maps on paper or other flat mapping surfaces in a manner to be described below.

Preferred methods of utilizing the carved model will now be described.

The carving may be covered with a transparent film of waterproof material having a surface on which inked lines and letters may be drawn. On this surface, which already contains grid and contour lines, are now drawn conventional map indications showing roads, streams, towns, names, etc., as on a conventional topographic map. The block, thus prepared, is now restored to its original position beneath the projection cameras by means of registration stops or pins with which the block was in contact at the time it was carved, and an unexposed photographic plate is substituted for the photographic plate in one of the cameras, being placed in a definite position relative to the projection lens corresponding with that of the photographic lens, this being accomplished by means of registration stops. This plate is placed with its unsensitized surface turned towards the projection lens, the optical distance between lens and sensitized surface allowing for the thickness and refractive index of the glass or equivalent material of the plate, being made to correspond with that between the lens and emulsion side of the plate employed in producing the stereoscopic plastic image in accordance with which the carving of the block was effected. With the plate thus in position an exposure is now made, and developed as a positive, showing in dark lines on a clear transparent background the contour and grid lines and conventional map indications appearing on the block. This developed plate is now returned to position in the projection camera and the original photographic plate placed behind it with the emulsion sides of the two plates in contact, both plates being in their original optical relationship to the lens, the same stops as before referred to being employed to accomplish this result.

Figure 5:
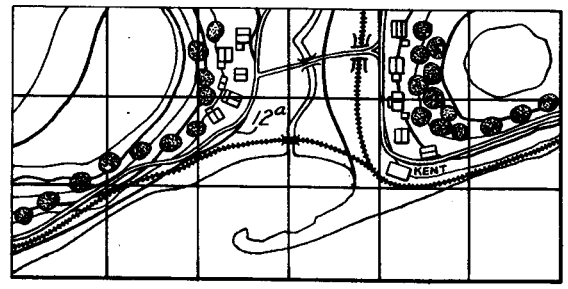
Figure 5 is a view of a carved block with conventional map representations drawn thereon and with a photographic representation of the terrain superimposed thereon.

A duplicate of the carved block, preferably of suitable opaque white material, is now made, as by a mould and costing process, and a sensitized photographic emulsion is deposited on the carved surface of this duplicate. This block is now placed in correct relationship to the projection camera by means of registration stops previously referred to, exposed and subjected to positive development. The result, Fig. 5, is a block formed to correspond to the formation of terrain involved, on which is shown a detailed positive photograph of the terrain involved, the contour lines and grid lines, and also the conventional map indications, all in a three dimensional relationship corresponding to that in nature. The photographic detail is in positive representation, with grid, contour, and conventional map indications appearing as superimposed black lines. If negatives of the aerial photographs are employed in the projection cameras and negative development used in the final photographic operation, all other steps in the process being carried out as described, the final photographic relief map will show photographic detail in positive representation with contour, grid and conventional map indications shown as superposed white lines.

Figure 6:
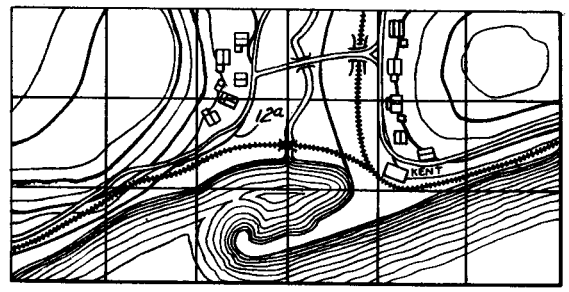
Figure 6 is a flat topographical map made by the processes of this invention.
Figure 7:
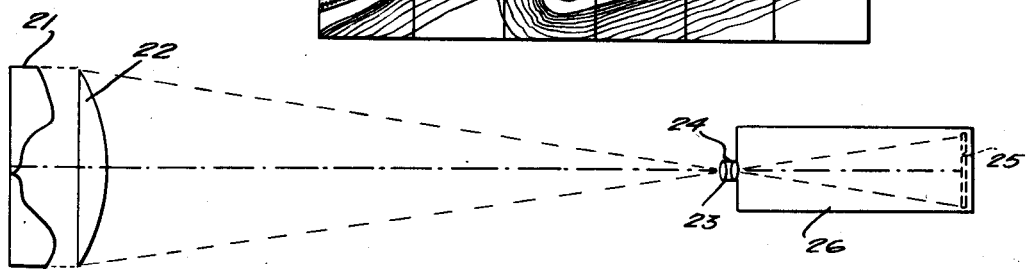
Figure 7 is a view of a diagrammatic representation of a telecentric apparatus which may be used for photographing the model for making flat topographical maps therefrom.

One purpose of the present invention is to accomplish the preparation of topographical (contoured) maps on paper or other plane surfaces by a method involving the use of carved layer blocks produced in the manner described. This may be accomplished by reproducing the outlines of the exposed edges of the layers on a mapping surface in the form of contour lines. A method of accomplishing this by reproducing the lines photographically with a telecentric optical system is described and claimed in United States Patent application of Hereward Lester Cooke, Serial No. 436,437, filed March 30, 1942, which is in part a continuation of the present application. Briefly the procedure covered in said application is as follows. When the layered and gridded block has been carved to correspond with the terrain formation, it is set up as shown in Fig. 7 in which 21 is the block, 22 is a plano-convex lens having its principal focus at 23, at which point is placed the photographic lens 24. The photographic plate 25, within the camera 26, is so placed that it and the virtual image of the block 21 formed by the lens 22 are at conjugate foci of the lens 24. The purpose of this telecentric system is to reduce the parallactic distortion of the image of the block 21 on the plate 25, this distortion being reducible to any desired limits by use of a lens of sufficiently long focal length. An image of the developed plate 25, which shows contour and grid lines, is now projected on a drawing surface and a tracing of these lines is then made by a draughtsman, or if sensitized paper is used the lines may be reproduced photographically. The addition of map information to the drawn or photographed contour and grid lines is then carried out in the normal manner, resulting in a topographical map similar to such maps as prepared by known procedure, Fig. 6.

It is possible to prepare a topographical map on paper in the manner described above at lower cost and with greater speed and accuracy than is possible by the use of the plastic image method as now practised, for instance, in the known "Multiplex" apparatus where the contours are located point by point and the contour lines drawn directly upon the mapping surface. It is much easier to reproduce the plastic image by carving, the contour lines being accurately produced by use of the laminations in the block, than it is to draw the lines in the first instance on the mapping surface. Substantially greater and more uniform accuracy of representation can also be achieved by carving and then photographing the carved model than can be achieved by the direct drawing of the contour lines as determined by visual observation of the plastic image.

An advantage of producing a contour map from a carved model having the contour lines thereon as compared with the drawing of the contour lines on a flat surface direct from the plastic image in accordance with the practise heretofore in use with the "Multiplex" apparatus, is that by the carved model method the accuracy of all parts of the work may be checked at all times during the carving of the block by direct visual inspection without resetting of any sort while under the old method there is no way of checking the accuracy of the map produced except by a tedious point-by-point procedure. In the old method as each point on the contour line is located and drawn, the floating mark is moved and accuracy of the work cannot be checked except by resetting the mark. In the case of the carved model, however, the accuracy of the coincidence between all portions of the surface of the model and plastic image can be checked at any time during the progress of the work or at the completion of the carving by the supervising officer, and when the model is finally accepted as accurate all of the contours are definitely fixed. Furthermore, the accuracy of any particular map can at any time be rechecked by reference to the model from which it was made and any changes in terrain easily corrected on the model. Furthermore by making the model first and then making the map photographically from the model, both the relief model and a flat map can be produced from one series of operations involving the securing of coincidence between the plastic image and the model (the only step in the process which is laborious), and therefore with practically no more work and expense than is involved in making only the flat map by present methods.

In conclusion it should be pointed out that there are two further outstanding and important advantages to the method of producing topographical maps by use of the carving process as opposed to the process of simply developing contour lines. First, there is no additional labor or time involved in obtaining a finished map with small contour intervals as opposed to large intervals, whereas the opposite is true of the older method in which the labor and expense increase with diminution of contour interval. Second, the surveying of strips of terrain lying between adjacent contour lines is automatically carried out with the same accuracy as the contour lines themselves, whereas in the older contour-drawing method these strips of terrain are not surveyed at all. Under certain circumstances the older method may give a totally erroneous impression of the detailed character of the surface of the terrain, while the method here described cannot fail to make this character of detail evident. For instance the side of a hill which had been terraced for cultivation would appear smooth if mapped by the contour line method but the terracing would be clearly shown in the carved relief map.

We claim:

1. The method of making a contour map which consists in carving a block of carvable material having officially contrasting layers located at predetermined positions in said block into a relief of the terrain to be mapped so as to expose the edges of said contrasting layers, photographing said block so that the exposed edges of said layers will appear as contour lines, and producing a contour map from said photograph.

2. The method of making a relief map having datum lines located thereon in predetermined relation, which consists in carving a block of carvable material having layers of optically contrasting material located therein in predetermined position to correspond with the relief of the terrain to be mapped so that the exposed edges of said contrasting layers will appear as datum lines on the surface of the relief and drawing conventional map indications of roads, houses, names of towns, etc., on said carved block.

3. The method of constructing a topographical contour map which comprises carving a model of terrain on a base having layers of optically contrasting material therein whereby the base is adapted to reveal contour and grid lines as the carving proceeds, photographically sensitizing the carved surface, projecting thereon a photograph of the terrain represented in the same scale as the carved model and photographically developing the exposed surface.

4. The method of making a relief map having datum lines located thereon in predetermined relation which consists in projecting a pair of overlapping aerial photographs of terrain on a block of carvable material having layers of optically contrasting material located thereon in predetermined position, said photographs being projected in such relation as to produce a plastic image of the terrain on the block, carving said block so as to correspond with the relief of the terrain as shown by said plastic image so that the exposed edges of said contrasting layers will appear as datum lines on the surface of the relief, photographing said model from a position corresponding with the position of projection of one of said photographs used to produce the plastic image, producing a duplicate of said carved relief model having a photographically sensitized surface, simultaneously projecting on said sensitized surface one of the photographs of the terrain and the photograph of the carved model taken from the position of projection of said photograph, and photographically developing the exposed sensitized surface of the model so as to produce thereon a photographic representation of the terrain together with a photographic reproduction of said datum lines.

5. A blank for the production of contoured and gridded relief maps comprising a block of carvable material divided into layers of equal and uniform thickness and into grid form, respectively, by thin horizontal and vertical layers of optically constrasting material of such composition that the block can be carved as a substantially homogeneous unit.

6. A geographical relief may comprising a rigid block having an uneven face, the contour of which corresponds to the contour of the territory represented, the said block comprising a series of planes of contrasting colors, the exposed edges of alternate planes appearing on the surface of the map as contour lines, and having a picture of the territory represented superimposed upon the uneven surface of the said rigid base with correspondence of images and contours.

7. In a method of making contour maps, the steps which consist in carving a blank of material built up of horizontal layers of optically contrasting material, into a relief of the terrain to be mapped, thereby exposing the edges of said contrasting layers in irregular form dependent upon the contour of the terrain and reproducing the outlines of the exposed edges of the layers on a mapping surface in the form of contour lines.

8. The method of making a relief model of terrain having datum lines located thereon in predetermined relation which consists in projecting a pair of overlapping aerial photographs of terrain on a block of carvable material having layers of optically contrasting material located therein in predetermined position, said photographs being projected in such relation as to produce a plastic image of the terrain on said block, and carving said block so as to correspond with the relief of the terrain as shown by said plastic image, so that the exposed edges of said contrasting layers will appear as datum lines on the surface of the relief.

9. The method of making a contour map of terrain which consists in projecting a pair of overlapping aerial photographs of terrain on a block of carvable material having horizontal layers of optically contrasting material located therein in predetermined position, said photographs being projected in such relation as to produce a plastic image of the terrain on the block, carving said block so as to correspond with the relief of the terrain as shown by said plastic image, so that the exposed edges of said contrasting layers will appear as datum lines on the surface of the relief, preparing a map of the terrain on a mapping surface and reproducing lines of the same outline as the exposed edges of said layers on said map as contour lines.

10. A relief model of terrain comprising a rigid block having a surface which corresponds at all points and in all relations of points in substantially exact quantitative manner in three dimensions with the form of the surface represented in such model, said model being built of alternate horizontal layers of optically contrasting material, each of said layers being of uniform and known thickness throughout its extent, the edges of said layers appearing in the model as contour lines.

11. A relief model of terrain comprising a rigid block having a surface which corresponds at all points and in all relations of points in substantially exact quantitative manner in three dimensions with the form of the surface represented in such model, said model being built of alternate horizontal layers of optically contrasting material, each of said layers being of uniform and known thickness throughout its extent, the edges of said layers appearing in the model as contour lines, said model also having thin vertical layers of optically contrasting material passing through the same, the top exposed edges of which appear as grid lines in the completed model.

12. A blank for the production of contoured relief maps comprising a plurality of horizontal layers of uniform thickness separated by layers of optically contrasting material of substantially lesser thickness, all of said layers being firmly united throughout their extent to form a solid block, all said layers being formed of carvable material, whereby, when the block is carved to represent an irregular surface, the edges of the contrasting layers, where they appear between adjacent thicker layers, constitute contour lines.

13. A blank for the production of contoured relief maps comprising a plurality of horizontal layers of uniform thickness separated by layers of optically contrasting material, all of said layers being firmly united throughout their extent to form a solid block, all said layers being formed of carvable material, whereby, when the block is carved to represent an irregular surface, contrasted layers will constitute contour lines.

14. A blank for the production of contoured relief maps comprising a plurality of groups of horizontal layers of uniform thickness, the layers of each group being separated from each other by layers of optically contrasting material, each group being separated from the adjacent groups by layers of material optically differentiated from the contrasting material which separates the layers within the group, all of said layers being firmly united throughout their extent to form a solid block, and all said layers being formed of carvable material, whereby, when the block is carved to represent an irregular surface, contrasted layers will constitute contour lines, divided into groups by the layers formed by the distinguishable material between the grouped layers.

HEREWARD LESTER COOKE.
GAYLORD P. HARNWELL.

CERTIFICATE OF CORRECTION.

Patent No. 2,309,627. February 2, 1943.

HEREWARD LESTER COOKE, ET AL.

It is hereby certified that error appears in the printed specification of the above numbered patent requiring correction as follows: Page 2, second column, line 26, for "costing" read --casting--; page 3, second column, line 25, claim 1, for "officially" read --optically--; line 58, claim 4, for "thereon" read --therein--; page 4, first column, line 10, claim 5, for "constrasting" read --contrasting--; line 13, claim 6, for "may" read --map--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.